(12) United States Patent
Lu

(10) Patent No.: US 9,390,205 B2
(45) Date of Patent: Jul. 12, 2016

(54) VORTICITY-REFINEMENT BASED NUMERICAL METHOD FOR SIMULATING AIRCRAFT WING-TIP VORTEX FLOWS

(71) Applicant: Ming Lu, Tianjin (CN)

(72) Inventor: Ming Lu, Tianjin (CN)

(73) Assignee: Xi'an Virtual-Dynamics Simulation Technology Inc., Xi'an (CN)

( * ) Notice: Subject to any disclaimer, the term of this patent is extended or adjusted under 35 U.S.C. 154(b) by 215 days.

(21) Appl. No.: 13/985,045

(22) PCT Filed: Sep. 28, 2012

(86) PCT No.: PCT/CN2012/082235
§ 371 (c)(1),
(2) Date: Jul. 30, 2014

(87) PCT Pub. No.: WO2013/078910
PCT Pub. Date: Jun. 6, 2013

(65) Prior Publication Data
US 2014/0343905 A1    Nov. 20, 2014

(30) Foreign Application Priority Data

Nov. 30, 2011    (CN) .................. PCT/CN2011/083187

(51) Int. Cl.
*G06F 7/60*        (2006.01)
*G06F 17/10*       (2006.01)
*G06F 17/50*       (2006.01)

(52) U.S. Cl.
CPC ........ *G06F 17/5009* (2013.01); *G06F 17/5018* (2013.01); *G06F 17/5095* (2013.01); *G06F 2217/16* (2013.01)

(58) Field of Classification Search
CPC ............ G06F 17/5009; G06F 17/5095; G06F 17/5018; G06F 2217/16; G06F 17/50
USPC ....................................... 703/2, 8, 6
See application file for complete search history.

(56) References Cited

U.S. PATENT DOCUMENTS

2011/0112800 A1*    5/2011    Kim .................... G06F 17/5018
                                                              703/1

OTHER PUBLICATIONS

Hahn, Seonghyeon et al., "Towards Adaptive Vorticity Confinement", Jan. 5-8, 2009, 47th AIAA Aerospace Sciences Meeting Including the New Horizons Forum and Aerospace Exposition, American Institute of Aeronautics and Astronautics.*

Steinhoff, John et al., "Modification of the Euler Equations for "Vorticity Confinement": Application to the Computation of Interacting Vortex Rings", Aug. 1994, Phys. Fluids 6 (8), American Institute of Physics.*

Karagozian, A.R., "An Analytical Model for the Vorticity Associated with a Transverse Jet", Mar. 1986, vol. 24, No. 3, AIAA Journal.*

(Continued)

*Primary Examiner* — Cedric D Johnson

(57) ABSTRACT

The present invention relates a numerical method to simulate the incompressible wing-tip vortex flows. This method is called Vorticity-Refinement, which refines the added vorticity as two different forms of force multiplied by two different factors to counteract the numerical diffusions in the numerical solutions by utilizing the high-order spatial discretization and improving the stability and convergence of the governing equations for incompressible flows.

5 Claims, 2 Drawing Sheets

(56) References Cited

OTHER PUBLICATIONS

Charney, J.G. et al., "Numerical Integration of the Barotropic Vorticity Equation", Nov. 1950, vol. 2, No. 4, Tellus: A Quarterly Journal of Geophysics.*

Costes, M. et al., "An Automatic Anti-Diffusion Method for Vortical Flows Based on Vorticity Confinement", 2003, Aerospace Science and Technology, 7, Elsevier, S.A.S.*

Steinhoff J. et al "Modification of the Euler Equations for Vorticity Confinement Application to the Computation of Interacting Vortex Rings", Phys. Fluids 6, 2738-2744,1994.

Costes, M. et al. "An Automatic Anti-Diffusion Method for Vortical Flows Based on Vorticity Confinement," Aerospace Science and Technology, vol. 7, No. 1, 2003, pp. 11-21.

Hahn S. et al. "Towards Adaptive Vorticity Confinement", AIAA 2009-1613, 47th AIAA Aerospce Science Meeting, Jan. 2009.

Karagozian A.R. "An Analytical Model for the Vorticity Associated with a Transverse Jet", AIAA Journal, vol. 24, No. 3, Mar. 1986.

Charney J.G. et al."Numerical Integration of the barotropic Vorticity Equation",A Quarterly Journal of Geophysics, vol. 2, No. 4, Nov. 1950.

\* cited by examiner

VORTICITY-REFINEMENT BASED NUMERICAL METHOD FOR SIMULATING AIRCRAFT WING-TIP VORTEX FLOWS

FIELD OF THE INVENTION

The present invention relates a numerical method in computation fluid dynamics. Particularly, it is a vorticity-refinement based numerical method for simulating aircraft wingtip vortex flows. This method is implemented using computer language codes and the codes are run on computer to simulate incompressible wing-tip vortex flows, which are vortex-dominated flows.

BACKGROUND OF THE INVENTION

When aircrafts fly with angle of attack, since the pressure differential between the upper surface and the lower one lets air flows 6 rotate around the tip of wing 4, a continuous vortex generate at the wing-tip and go down stream, like shown in the FIG. 1. This flow pattern is called the wing-tip vortex flows 5, which are vortex-dominated flows. If aircraft flying speed is smaller than 0.3 Mach number, the flow is incompressible flow. Actually, the wing-tip vortex could damage aircraft stability and deduce the lift, because the wing-tip vortex can generate an unsteady downwash, which produces an induced drag to aircraft as to deduce the ratio of lift to drag, and more, which can spread down-stream as far as several kilometers and form a dangerous zone for the following aircrafts. Most aircrafts have the devices to reduce the wing-tip vortex.

There are several methods to study the wing-tip vortex, among which, the numerical simulation, combining fluid dynamics, applied mathematics, computer science, due to its low cost and visualization property, occupies an important role. It is an extended application of computational fluid dynamics (CFD) in exploration to the mechanism of fluid flows and in design of industrial products. A biggest challenge for CFD is to improve the accuracy of simulation, to reduce error, loyally descript the physical characteristics of the fluid flows.

One of the important factors to affect the accuracy of CFD is the numerical diffusion in the numerical solutions when numerical methods are used to solve the fluid flow governing equations, such as the Euler or the Navier-Stokes equations. For examples, the spatial discretization methods, such as central or upwind difference, the temporal discretization methods, such as explicit or implicit methods, the usage of turbulence models, such as the two-equation or LES model, and the orthogonality of computing grids, all could produce the numerical diffusion. Additionally, some artificial diffusion is often added in numerical solutions to improve the numerical convergence by deducing the computing accuracy. For examples, the capture of the discontinuity interfaces, such as shocks, is achieved by appropriately adding some artificial diffusion in avoiding the numerical oscillation around the large gradient in the numerical solutions with higher accuracy. The numerical diffusion can be considered as a kind of energy loss in flow field, which makes the computational results be not very accuracy. The Advanced numerical methods should minimize the numerical diffusion under premise of achieving the convergent numerical solutions.

The most significant effect of the numerical diffusion to numerical simulation results is on the capture to the discontinuity interfaces. As mentioned earlier, it physically makes sense to add some artificial diffusion to capture the strong continuity interfaces, such as shocks, since across which the velocity, density and pressure all are discontinuous and there exists the energy losing in the form of entropy increasing. However, over large artificial diffusions could make the strong continuity interfaces smeared, which reduces the prediction accuracy of the shock intensity and position. Another type discontinuity in flow field is the contact discontinuity. It is a weak discontinuity, across which density and velocity in tangent direction is discontinuous while pressure and velocity in normal direction is continuous. This kind contact discontinuity, as the most significant property of the vortex-dominated flows and widely exists in engineering applications, such as the wing-tip vortex flows, is more difficult to capture compared to the strong discontinuity in numerical solutions, since very little amount of numerical diffusion could make the contact discontinuity interfaces smeared to a point damaging the accuracy. This is why developing the numerical methods to simulate the vortex-dominated flows is a big challenge for CFD workers.

A method to improve the simulation accuracy of vortex-dominated flows, such as the wing-tip vortex flows, is that solving the flow governing equations by using very fine computing grid, which costs more computing time. Moreover, the computing error could accumulate with the increasing of the number of computing grid cells. Another method is that intensifying a variable describing vortex flow movement, vorticity, by artificially adding physics models when solving the flow governing equations. For examples, adding the point vortex model could artificially increase vorticity. Locally solving the vorticity equation could reduce the vorticity losing in its transportation. However, the usage of those methods is quite limited, since the point vortex model is only for some simple flow situations where the position of vortex is known. Solving the vorticity equation is more complicated than doing the Euler or Navier-Stokes equations themselves.

In the earlier of 20 century, a vorticity confinement (CV) method was created by Steinhoff[1] to improve the simulation accuracy of incompressible vortex-dominated flows. Its working principle is that a source term as a vorticity-related body force is added in the momentum equations of the flow governing equations as to the vorticity diffusion can be removed from the numerical diffusions, which keeps the contact discontinuity interfaces in vortex-dominated flows out of smearing, so that the vortex structure can be captured more accurately. The details of the vorticity confinement are as follows. Firstly, the governing equations for the incompressible, invicid flows include the continuity equation and momentum equations, which are $$\nabla \cdot \vec{V} = 0, \quad (1)$$

$$\frac{\partial \vec{V}}{\partial t} + (\vec{V} \cdot \nabla)\vec{V} + \frac{1}{\rho}\nabla p = \vec{B}, \quad (2)$$

where, $\vec{v}$ is the velocity vector, $\vec{v} = ui+vj+wk$, including three-dimensional components u, V, w in the direction i, j, k in the Cartesian coordinate system; $\rho$, p and t respectively represents the density, pressure and time.

In above equations, the operator $\nabla$ presents $$\nabla = \frac{\partial}{\partial x}i + \frac{\partial}{\partial y}j + \frac{\partial}{\partial z}k;$$

the symbol • does the inner product. In the vorticity confinement, $\vec{B}$, the source term in form of body force in the right hand side of the momentum equation (2), is defined as $$\vec{B} = \vec{n}_c \times \vec{\omega}, \quad (3)$$

where, $\vec{\omega}$ presents the vorticity, $\vec{\omega} = \omega_x i + \omega_y j + \omega_z k$ in the Cartesian coordinate system; the operator x presents the cross product. Based on the definition of the vorticity, $$\vec{\omega} = \nabla \times \vec{V} = \begin{vmatrix} i & j & k \\ \frac{\partial}{\partial x} & \frac{\partial}{\partial y} & \frac{\partial}{\partial z} \\ u & v & w \end{vmatrix} = \left(\frac{\partial w}{\partial y} - \frac{\partial v}{\partial z}\right)i + \left(\frac{\partial u}{\partial z} - \frac{\partial w}{\partial x}\right)j + \left(\frac{\partial v}{\partial x} - \frac{\partial u}{\partial y}\right)k,$$

where, $\vec{n}_c$ presents the gradient direction of the vorticity, $$\vec{n}_c = \frac{\nabla \phi}{|\nabla \phi|}, \quad (4)$$

where, $\phi$ is the magnitude of the vorticity and $|\nabla \phi|$ is the magnitude of the gradient of the magnitude of vorticity. Then, $$\phi = |\vec{\omega}| = \sqrt{\omega_x^2 + \omega_y^2 + \omega_z^2}, \quad (5)$$

$$|\nabla \phi| = \sqrt{\left(\frac{\partial \phi}{\partial x}\right)^2 + \left(\frac{\partial \phi}{\partial y}\right)^2 + \left(\frac{\partial \phi}{\partial z}\right)^2}. \quad (6)$$

The source term $\vec{B}$ in the momentum equation (2) needs to be multiplied by a factor $\epsilon$, $$\vec{B} = \epsilon(\vec{n}_c \times \vec{\omega}), \quad (7)$$

which physically means a force at the center point of the vortex. In Steinhoff's original vorticity confinement, the factor $\epsilon$ is a constant value (0.01~0.05), which can adjust the level of the vorticity confinement. This method has a simple formulation and needs not fined computing grids, so that it had been widely used in the simulation of vortex-dominated flows. The modification to this method in the following years is focused on the expression of the factor $\epsilon$[2][3]. Although the vorticity confinement, based on the principle of adding a certain amount of vorticity to counteract the numerical diffusion on the contact discontinuity, had significantly improved the accuracy of simulation in vortex-dominated flows, it has the following defects, 1. The added vorticity is totally controlled by the factor $\epsilon$;
2. The order of the spatial discretization of the added vorticity is limited;
3. The effect of the added source term on the convergence of the momentum equation is uncertain.

To more accurately simulate the wing-tip vortex flows, it is necessary to modify the mechanism to capture the contact discontinuity in incompressible vortex-dominated flows field. A new way is to refine the precision of the added vorticity in the source term in the momentum equation to counteract the numerical diffusions. This invention presents a new numerical method, which is called Vorticity-Refinement, where undertakes the high-order spatial discretization to the added vorticity and improve the convergence effect of the source term on the momentum equation.

SUMMARY OF THE INVENTION

The present invention relates a numerical method to simulate the incompressible wing-tip vortex flows. This method is called Vorticity-Refinement, where the vorticity with two different forms is added to counteract the numerical diffusions. The added vorticity is to be undertaken high-order spatial discretization and improve the convergence effect of the source term on the momentum equation at the same time.

As the equation (2) indicates, the VC method needs to add a body force term expressed as the equation (7), which means a force in the reverse direction of the gradient of vorticity, in the right hand side of the momentum equation for the incompressible flows. Actually, if bringing the equation (4) into (7), and using the $\nabla$ operation, one can receive $$\vec{B} = \epsilon(\vec{n}_c \times \vec{\omega}) \quad (8)$$
$$= \epsilon \frac{\nabla \phi}{|\nabla \phi|} \times \vec{\omega}$$
$$= \epsilon \nabla \times \left(\frac{\phi}{|\nabla \phi|} \vec{\omega}\right) - \epsilon \frac{\phi}{|\nabla \phi|}(\nabla \times \vec{\omega}).$$

If the $\nabla$ operation is applied on the above equation (8), it has $$\nabla \times \vec{\omega} = \nabla \times (\nabla \times \vec{V}) = \nabla(\nabla \cdot \vec{V}) - \nabla^2 \vec{V}, \quad (9)$$

where $\nabla^2$ is the Laplace operator defined as $$\nabla^2 = \frac{\partial^2}{\partial x^2} + \frac{\partial^2}{\partial y^2} + \frac{\partial^2}{\partial z^2}.$$

If bring the equation (9) into (8) and considering the equation (1), the continuity equation for incompressible flows ($\nabla \cdot V = 0$), one can have $$\vec{B} = \epsilon \nabla \times \left(\frac{\phi}{|\nabla \phi|} \vec{\omega}\right) + \epsilon \frac{\phi}{|\nabla \phi|}(\nabla^2 \vec{V}). \quad (10)$$

For the incompressible flows, the equation (10) is equivalent to the equation (9). Rewrite the term $\vec{B}$ in the equation (10) as the following form $$\vec{B} = \vec{B}_1 + \vec{B}_2, \quad (11)$$

where, $$\vec{B}_1 = \epsilon_1 \nabla \times \left(\frac{\phi}{|\nabla \phi|} \vec{\omega}\right); \quad (12)$$

$$\vec{B}_2 = \epsilon_2 \frac{\phi}{|\nabla \phi|}(\nabla^2 \vec{V}). \quad (13)$$

$\vec{B}_1$ is call the helicity force in the gradient direction of vorticity, since $\nabla \times \vec{\omega}$ is the definition of the helicity; while $\vec{B}_2$ is called the viscous dissipation force in the gradient direction of vorticity, since the viscous dissipation property of the Laplace operation.

Until now, the term $\vec{B}$, the vorticity confinement, which is the force in the reverse direction of gradient of the vorticity, has been divided into two part forces: one is $\vec{B}_1$ the helicity force in the gradient direction of vorticity, which is related with the gradient direction and magnitude of vorticity; another one is $\vec{B}_2$ the viscous dissipation force in the gradient direction of vorticity, which is only related with the direction. The FIG. 2 shows the formation and relation of those two forces, where $\vec{\omega}$ the vorticity and $\vec{n}_c$ the gradient direction of vorticity form the plane (1), the vorticity function plane, which is perpendicular to $\vec{B}$ the direction of the original vorticity confinement. $\vec{B}$ and its two components $\vec{B}_1$ and $\vec{B}_2$ form plane (3), the original vorticity confinement plane. The plane (1) is perpendicular to the plane (3). The angle between $\vec{B}_1$ and $\vec{\omega}$ is called the helicity angle (2) and its cosine is $$\frac{\phi}{|\nabla\phi|}.$$

The two different force $\vec{B}_1$ and $\vec{B}_2$ from the decomposition of the vorticity confinement $\vec{B}$ will affect numerical simulations in different way.

In the equation (12) and (13), there are two different factors, $\epsilon_1$ and $\epsilon_2$. If they both are equal to $\epsilon$ in the equation (7), the method is called isotropic vorticity confinement, which is equivalent to the original vorticity confinement; while it is called anisotropic vorticity confinement if they are not equal. The simulation accuracy of incompressible vortex-dominated flows can be improved by using the anisotropic vorticity confinement.

The added source term, which makes the equation (2) stiffness, could reduce the stability and convergence for a class of explicit temporal integrations for numerical solutions. To keep the time accuracy of the solutions, very some time integration steps have to be used, which heavily cost the computing time. The standard to judge the equation stiffness is the eigenvalues of the Jacobian of source term. If the ratio of the real part of the maximum eigenvalues to the minimum one is small, the stiffness of the partial differential equations is weak, which means the numerical solutions are easy to convergent, and more stable.

There are two possibilities: one is that the source term is $\vec{B}$, the original vorticity confinement, whose Jacobian matrix is $\overline{\overline{S}}$ with the eigenvalues $\lambda_i^B$, where i is equal to 2 or 3; while another possibility is that the one is $\vec{B}_2$, the viscous dissipation force in the gradient direction of vorticity, whose Jacobian matrix is $\overline{\overline{S}}_2$ with the eigenvalues $\lambda_i^{B_2}$. In above two forms of body force, their Jacobian matrix are expressed respectively as $$\overline{\overline{S}} = \frac{\partial \vec{B}}{\partial \vec{V}}, \tag{14}$$

$$\overline{\overline{S}}_2 = \frac{\partial \vec{B}_2}{\partial \vec{V}}. \tag{15}$$

According to the method to find the eigenvalues of the Jacobian, it needs to solve the following equations, $$|\lambda_i^B I - \overline{\overline{S}}| = 0 \text{ and } |\lambda_i^{B_2} I - \overline{\overline{S}}_2| = 0, \tag{16}$$

where I is the unit matrix, and $$\frac{\min[\mathrm{Re}(\lambda_i^B)]}{\max[\mathrm{Re}(\lambda_i^B)]} \leq \frac{\min[\mathrm{Re}(\lambda_i^{B_2})]}{\max[\mathrm{Re}(\lambda_i^{B_2})]}. \tag{17}$$

The above equation, where Re indicates taking the real part operation, presents that the stiffness of the equation (2) with $\vec{B}_2$ as the source term is weaker than that with $\vec{B}$, which means that it will improve the stability and convergence of the numerical solutions when the explicit time integration is used to solve the momentum equation (2). To utilize this advantage, it needs to move $\vec{B}_1$ into the left hand side of the equation (2) and leave $\vec{B}_2$ in the right hand side, the source term position.

In the Vorticity-Refinement, one way to improve the numerical simulation accuracy is to utilize the high-order spatial discretization to $\vec{B}_1$, which is related to the gradient direction and magnitude of vorticity as expressed in the equation (12), where it is moved into the left hand of the momentum equation (2). The term $\vec{B}_1$ can be transferred into a form of flux by using the Gaussian theorem, which means that the integration to this term in any grid cells can be replaced with that to the flux across the interfaces of grid cells. In finite volume method, for any grid cells, $\Omega$ is the control volume, $\partial \Omega$ the surface, and dS the surface element. Based on the Gaussian theorem, the procedure transferring the volume integration into the flux integration can be expressed as $$\int_\Omega \vec{B}_1 \, d\Omega = \int_\Omega \varepsilon_1 \nabla \times \left(\frac{\phi}{|\nabla\phi|}\vec{\omega}\right) d\Omega \tag{18}$$

$$= \int_{\partial\Omega} \varepsilon_1 \vec{n} \times \left(\frac{\phi}{|\nabla\phi|}\vec{\omega}\right) dS,$$

where $\vec{n} = n_x \vec{i} + n_y \vec{j} + n_z \vec{k}$ is the unit vector of the interface of grid cells. In the interface, a vector is produced, which is called the helicity vector $\vec{F}_\omega$, $$\vec{F}_\omega = \varepsilon_1 \vec{n} \times \left(\frac{\phi}{|\nabla\phi|}\vec{\omega}\right). \tag{19}$$

Since this vector is related to the gradient direction and magnitude of the vorticity, it is possible to do the high-order spatial discretization schemes to this vector in the interfaces of grid cells to improve the numerical solution accuracy. For example, the high-order interpolation scheme to the variables in the flow field can be used to calculate the vector $\vec{F}_\omega$.

In addition, the results of capturing the contact discontinuity in vortex-dominated flows can be further improved by appropriately increasing $\epsilon_1$ and reducing $\epsilon_2$, which, corresponding to the anisotropic vorticity confinement, means increasing the helicity force in the gradient direction of vorticity and reducing and the viscous dissipation force in the gradient direction of vorticity. Overall, the present invention about improving the numerical simulation accuracy includes the following four technical steps. They are 1. dividing the original vorticity confinement into two parts $\vec{B}_1$ and $\vec{B}_2$, and move $\vec{B}_1$ into the left hand side of the momentum equation of incompressible flows;

2. transferring $\vec{B}_1$ into the flux on the interfaces of grid cells by utilizing the Gaussian theorem and discretizing the flux by using the high-order spatial discretization schemes;
3. keeping $\vec{B}_2$ in the source term position to improve the stability and convergence of the momentum equation of incompressible flows;
4. utilizing the different factor $\epsilon_1$ and reducing $\epsilon_2$, which refines the added vorticity and forms the vorticity refinement process. This method to simulate the incompressible wing-tip vortex flows is called the Vorticity-Refinement.

The main contain of the proposed invention on the numerical method to improve the simulation accuracy of the incompressible wing-tip vortex flows is that refining the vorticity added as two different forms of force multiplied by two different factors to counteract the numerical diffusions in the numerical solutions by utilizing the high-order spatial discretization and improving the stability and convergence of the governing equation. This method does not need increase the number of computing grid or other physical model and is easy to be embodied in computer codes.

DETAILED DESCRIPTION OF PARTICULAR EMBODIMENTS OF THE INVENTION

The following case is a preferred embodiment for the invention. This proposed numerical method had been implemented by using the computer codes written by Fortran 90 and the codes were run on computer to simulate the three-dimensional wing-tip vortex flow field generated by a delta wing at high angle of attack.

In this preferred embodiment, an incompressible inviscid flow around a delta wing with large aspect ratio is used to validate the proposed invention. Amount of experiments had shown that the wing-tip vortex flow around delta wing is the vortex-dominated. For the delta wing, the chord length is c; the span width is b; the aspect ratio is 7. A body-fitting structured grid with hexahedral cells was used, where O-type 192 cells around each section of the wing, 68 along the normal direction, and 96 along the spanwise. The FIG. 3 shows the delta wing configuration and the computing grid. The publicly known finite volume method (FVM) with the central variable scheme in each control volume cell was used to do the spatial discretization. The Conditions for the simulation are
the free stream velocity 57 m/s;
the atmosphere pressure 100 kPa;
the atmosphere density 1.2 kg/m3;
the angle of attack 20°.

The momentum equation for the incompressible inviscid flows does not include the viscous term $\vec{F}_v$ in equation (2). According to the present invention, it needs to add the vector $\vec{F}_\omega$ on the position at the left hand of the momentum equation. For the FVM, it needs calculate the flux of $\vec{F}_\omega$ at the interfaces of the grid cells and keep $\vec{B}_2$ at the position of source term. The conservation form of the momentum equation for incompressible inviscid flows is rewritten as $$\frac{\partial}{\partial t}\int_\Omega \vec{V}d\Omega + \int_{\partial\Omega}(\vec{F}_c - \vec{F}_\omega)dS = \int_\Omega \vec{B}_2 d\Omega, \quad (20)$$

where the conservation variable $\vec{V}$, the convection variable $\vec{F}_c$ and the helicity vector $\vec{F}_\omega$ (shown in the equation (19)) are respectively $$\vec{V} = \begin{bmatrix} u \\ v \\ w \end{bmatrix}; \vec{F}_c = \begin{bmatrix} uV + n_x\frac{p}{\rho} \\ vV + n_y\frac{p}{\rho} \\ wV + n_z\frac{p}{\rho} \end{bmatrix}; \vec{F}_\omega = \varepsilon_1 \frac{\phi}{|\nabla\phi|}\begin{bmatrix} \omega_z n_y - \omega_y n_z \\ \omega_x n_z - \omega_z n_x \\ \omega_y n_x - \omega_x n_y \end{bmatrix}. \quad (21)$$

In above equation, density $\rho$ is a fixed value; V is the velocity variant, which is the dot-product of the outwards normal vector of the interface of grid cells $\vec{n}=n_x i+n_y j+n_z k$ and the velocity vector, $$V=\vec{V}\cdot\vec{n}=n_x u+n_y v+n_z w \quad (22)$$

The convection term $\vec{F}_c$ can be rewritten as an expansion form $$\vec{F}_c = \begin{bmatrix} u^2 + \frac{p}{\rho} \\ uv \\ uw \end{bmatrix}n_x + \begin{bmatrix} uv \\ v^2 + \frac{p}{\rho} \\ vw \end{bmatrix}n_y + \begin{bmatrix} uw \\ vw \\ w^2 + \frac{p}{\rho} \end{bmatrix}n_z. \quad (24)$$

The convection term also can be divided two parts, the convection vector without pressure and the pressure vector. Obviously, $$\vec{F}_c = \vec{F}_{cV} + \vec{F}_{cp}, \quad (25)$$

where, $$\vec{F}_{cV} = \begin{bmatrix} u^2 \\ uv \\ uw \end{bmatrix}n_x + \begin{bmatrix} uv \\ v^2 \\ vw \end{bmatrix}n_y + \begin{bmatrix} uw \\ vw \\ w^2 \end{bmatrix}n_z; \quad (26)$$

$$\vec{F}_{cp} = \begin{bmatrix} \frac{p}{\rho} \\ 0 \\ 0 \end{bmatrix}n_x + \begin{bmatrix} 0 \\ \frac{p}{\rho} \\ 0 \end{bmatrix}n_y + \begin{bmatrix} 0 \\ 0 \\ \frac{p}{\rho} \end{bmatrix}n_z. \quad (27)$$

The term $\vec{F}_\omega$ also can be rewritten as a form of expansion $$\vec{F}_\omega = \varepsilon_1 \frac{\phi}{|\nabla\phi|}\begin{bmatrix} 0 \\ \frac{\partial u}{\partial y} - \frac{\partial v}{\partial x} \\ \frac{\partial u}{\partial z} - \frac{\partial w}{\partial x} \end{bmatrix}n_x + \quad (28)$$

$$\varepsilon_1 \frac{\phi}{|\nabla\phi|}\begin{bmatrix} \frac{\partial v}{\partial x} - \frac{\partial u}{\partial y} \\ 0 \\ \frac{\partial v}{\partial z} - \frac{\partial w}{\partial y} \end{bmatrix}n_y + \varepsilon_1 \frac{\phi}{|\nabla\phi|}\begin{bmatrix} \frac{\partial w}{\partial x} - \frac{\partial u}{\partial z} \\ \frac{\partial w}{\partial y} - \frac{\partial v}{\partial z} \\ 0 \end{bmatrix}n_z.$$

Further, $\vec{B}_2$ can be rewritten as $$\vec{B}_2 = \varepsilon_2 \frac{\phi}{|\nabla \phi|} \begin{bmatrix} \frac{\partial^2 u}{\partial x^2} + \frac{\partial^2 u}{\partial y^2} + \frac{\partial^2 u}{\partial z^2} \\ \frac{\partial^2 v}{\partial x^2} + \frac{\partial^2 v}{\partial y^2} + \frac{\partial^2 v}{\partial z^2} \\ \frac{\partial^2 w}{\partial x^2} + \frac{\partial^2 w}{\partial y^2} + \frac{\partial^2 w}{\partial z^2} \end{bmatrix}, \quad (29)$$

where, $\phi$ and $|\nabla \phi|$ had been given in equation (5) and (6). The first and second-order derivative terms in equation (28) and (29) can be found using the Green or the Taylor expansion, which is publicly well known.

The following are the procedure to solve the governing equations (20) including $\vec{F}_\omega$ and $\vec{B}_2$ by the Pressure-Based Method for the incompressible flows in Collocated Grid.

Firstly rewrite the equation (20) in the discretization form, $$\left(\frac{\vec{V}^{t+\Delta t} - \vec{V}}{\Delta t}\right)\Omega_{i,j,k} + \sum_m^{N_F} \left(\vec{F}_{cV} + \vec{F}_{cp} - \vec{F}_\omega\right)_m \Delta S_m = \left(\vec{B}_2 \Omega\right)_{i,j,k}, \quad (31)$$

where $\Omega_{i,j,k}$ is the control volume, $\Delta t$ is integration time step, $\vec{V}^{t+\Delta t}$ is the updated velocity, $\Delta S_m$ is the control volume surface, $N_F$ is the number of control volume, which is 6 in three-dimension case. Reorganize the right hand side of the equation (31), then, $$\vec{R}(\vec{V}) = \sum_m^{N_F} \left(\vec{F}_{cV} - \vec{F}_\omega\right)_m \Delta S_m - \left(\vec{B}_2 \Omega\right)_{i,j,k} + \sum_m^{N_F} (\vec{F}_{cp})_m \Delta S_m. \quad (32)$$

Using a guessed initial velocity field $\vec{V}^*$ to calculate the right hand side $\vec{R}_c(\vec{V}^*)$ without pressure term, then $$\vec{R}_c(\vec{V}^*) = \sum_m^{N_F} \left[\vec{F}_{cV}(\vec{V}^*) - \vec{F}_\omega(\vec{V}^*)_m\right]\Delta S_m - \vec{B}_2(\vec{V}^*)\Omega_{i,j,k}. \quad (33)$$

Obviously, it has $$\vec{R}(\vec{V}) = \vec{R}_c(\vec{V}^*) + \sum_m^{N_F} (\vec{F}_{cp})_m \Delta S_m. \quad (34)$$

This guessed initial velocity field $\vec{V}^*$ can be found from equation (31), which means $$\vec{V}^* = \vec{V} - \frac{\Delta t}{\Omega_{i,j,k}} \vec{R}_c(\vec{V}), \quad (35)$$

where the $\vec{R}_c(\vec{V}^*)$ needs $\vec{F}_{cV}$, $\vec{F}_\omega$, and $\vec{B}_2$, which are shown in equation (33).

In the equation (28) for the $\vec{F}_\omega$, the first-order derivative term can be done using high-order discretization, such as the three-order spatial discretization for term $\partial u/\partial x$ in i-direction, which means $$\frac{\partial u}{\partial x} = \frac{2u_{i+1} + 3u_i - 6u_{i-1} + u_{i-2}}{6\Delta x}. \quad (36)$$

The velocity $\vec{V}^*_m$ at the interface m of the grid cells can be found by the publicly known MUSCL interpolation from the velocity at the cell center.

Based on the equation (35), the velocity $\vec{V}^*_m$ at the interface m can be expressed as $$\vec{V}^*_m = \vec{V}_m - \frac{\Delta t}{\Omega^*_m} \vec{R}_c(\vec{V}^*_m), \quad (37)$$

where, $\Omega^*_m$ is the volume of the auxiliary cells containing the interface of the grid cells m, where the velocity with pressure is $$\vec{V}_m = \vec{V}^*_m - \frac{\Delta t}{\Omega_{i,j,k}} \vec{R}_c(\vec{V}^*_m) - \frac{\Delta t}{\Omega_{i,j,k}} \vec{R}_{pm}, \quad (38)$$

where $\vec{R}_{pm}$ is from the equation (32). Reorganizing the equation (37) and (38), then $$\vec{V}_m = \vec{V}^*_m - \frac{\Delta t}{\Omega_m} \vec{R}_{pm}. \quad (39)$$

The velocity with pressure $\vec{V}_m$ should follow the continuity equation $\nabla \cdot \vec{V} = 0$. Rewrite the continuity equation in a discretized form $$\sum_m^{N_F} \vec{V}_m \Delta S_m = 0. \quad (40)$$

Bring the equation (39) into (40), then $$\sum_m^{N_F} \left(\vec{V}^*_m - \frac{\Delta t}{\Omega_{i,j,k}} \vec{R}_{pm}\right) \Delta S_m = 0. \quad (41)$$

After solving equation (41), the velocity $\vec{V}_m$ and pressure $p_m$ at the time $t+\Delta t$ on the interface m are obtained.

The table 1 shows the comparison of the effect of the source term to the stability and convergence at different residual level using iteration times from the two methods,

TABLE 1

| | Residual | | | |
|---|---|---|---|---|
| | $10^{-6}$ | $10^{-8}$ | $10^{-10}$ | $10^{-12}$ |
| Original VC | 502 | 785 | 1250 | 1510 |
| Present method | 234 | 556 | 870 | 1001 |
| Improvement | 32% | 30% | 30% | 33% |

The present invention with $\epsilon_1=0.07$ and $\epsilon_2=0.03$ shows more than 30% faster than that by the original CV with $\epsilon=0.05$, which should be owning to the form of the source term $\vec{B}_2$.

The FIG. 4 shows the validation of the proposed method. This is the comparison of the effect of the present method by the vorticity contours above the delta wing by the above mention two methods. The vorticity captured by the proposed method with $\epsilon_1=0.07$ and $\epsilon_2=0.03$ in this invention is more strong than that by the original CV with $\epsilon=0.05$ which should be owning to the high-order discretization to the $\vec{B}_1$ and usage of different factor $\epsilon_1$ and $\epsilon_2$, which is the Vorticity-Refinement.

Above is the content of this invention. The invented numerical method also can be applied for any other incompressible vortex-dominated flows, so that any application of the present invention on above-mentions flows should be on the protection of this invention.

REFERENCE

Figure 1:
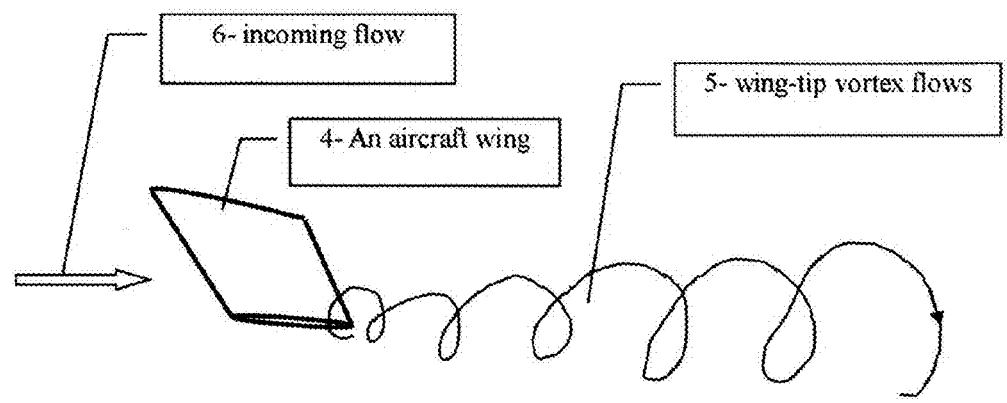
FIG. 1 shows the aircraft wing-tip vortex generation, where 4 presents an aircraft wing, 5 does the wing-tip vortex flows, 6 does incoming flows.
Figure 2:
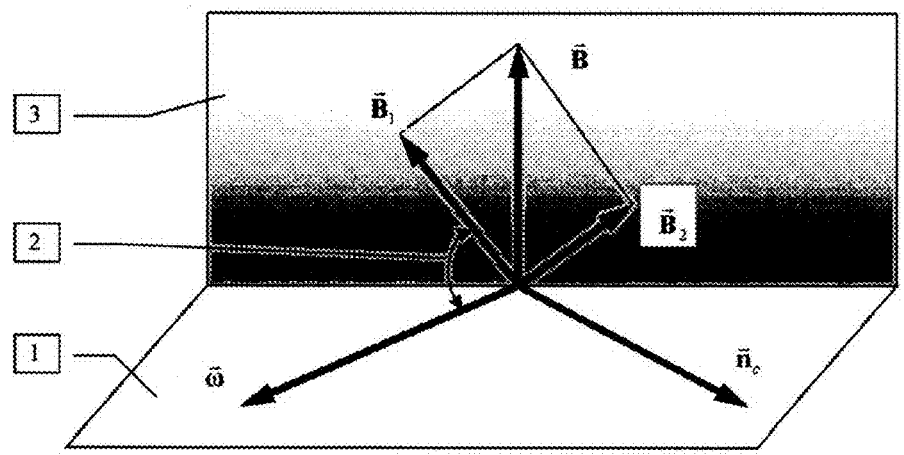
FIG. 2 shows the principle of formation and relationship of the helicity force in the gradient direction of vorticity and the viscous dissipation force in the gradient direction of vorticity, where 1 presents the vorticity function plane, 2 dose the helicity angle and 3 dose the original vorticity confinement plane.
Figure 3:
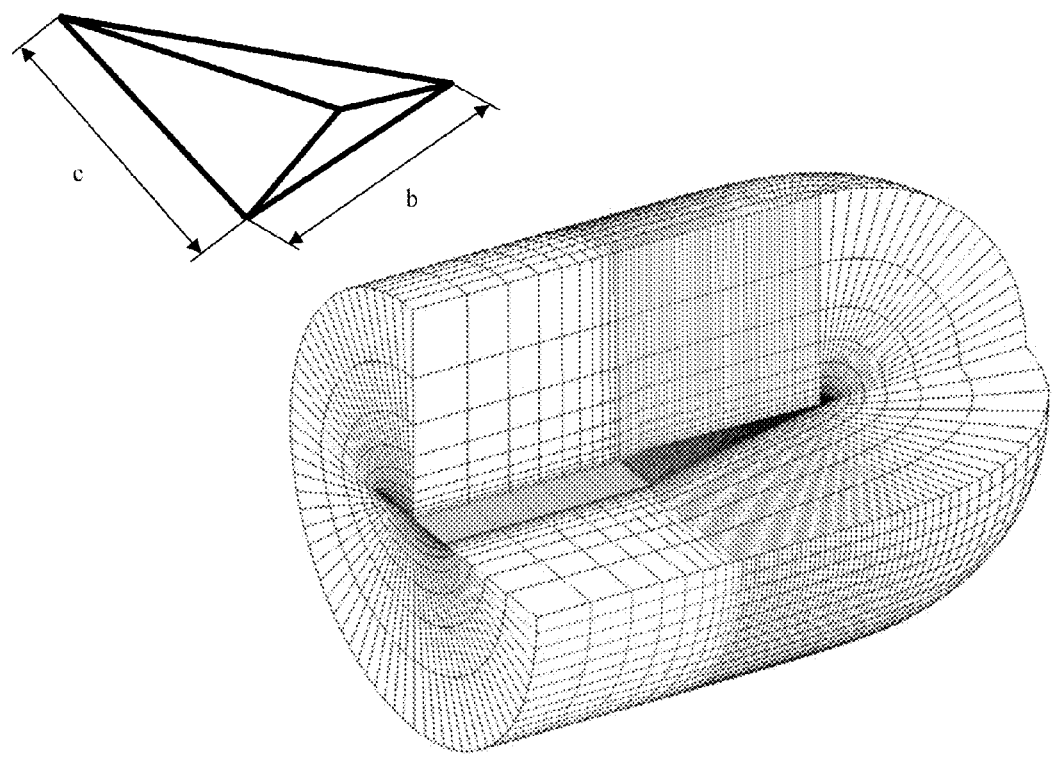
FIG. 3 shows the delta wing configure and the computing grid.
Figure 4:
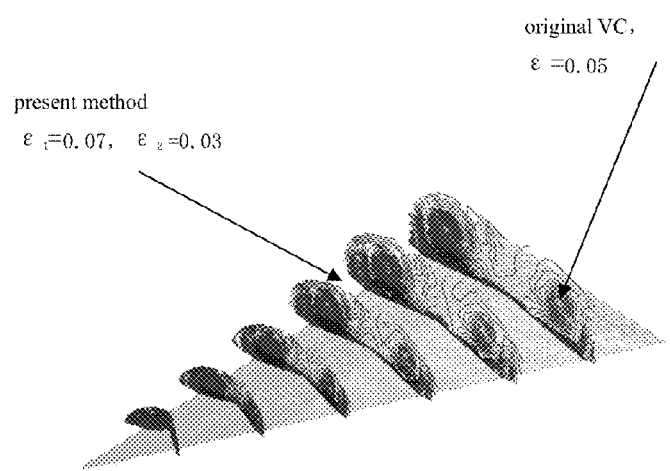
FIG. 4 shows the validation of the numerical method: the effect of the anisotropic vorticity confinement.

1. Steinhoff, J. and Underhill, D., 1994. "Modification of the Euler Equations for Vorticity Confinement Application to the Computation of Interacting Vortex Rings", Phys. Fluids 6, 2738-2744.
2. Hahn, S. and Iaccarino, G., "Towards Adaptive Vorticity Confinement", AIAA 2009-1613.
3. Costes, M. and Kowani, G., "An Automatic Anti-Diffusion Method for Vortical Flows Based on Vorticity Confinement," Aerospace Science and Technology, Vol. 7, No. 1, 2003, pp. 11-21.

What is claimed is:

1. A computer implemented numerical method, vorticity-refinement, for simulating aircraft wing-tip vortex flows, said vorticity: refinement includes the following steps:
   (1) dividing an original vorticity confinement into two parts, $\vec{B}_1$ and $\vec{B}_2$, and moving $\vec{B}_1$ into left hand side of momentum equation of incompressible flows;
   (2) transferring the $\vec{B}_1$ into flux on interfaces of computing cells by utilizing a Gaussian theorem and discretizing the flux by using high-order spatial discretization schemes;
   (3) keeping the $\vec{B}_2$ in a source term position of the momentum equation of incompressible flows;
   (4) simulating the wing-tip vortex of an aircraft, on a computer, utilizing two different factors $\epsilon_1$ and $\epsilon_2$ in $\vec{B}_1$ and $\vec{B}_2$, refining added vorticity and forming the vorticity refinement process of the simulation; and
   (5) generating a graphical representation of the wing-tip vortex based on the simulation of the wing-tip vortex of the aircraft.

2. The computer implemented numerical method in claimed 1, wherein said $\vec{B}_1$ has a formation as $$\vec{B}_1 = \varepsilon_1 \nabla \times \left(\frac{\phi}{|\nabla \phi|} \vec{\omega}\right),$$

where, operator $\nabla$ presenting gradient operation; operator $\times$ presenting cross-product operation; $\vec{\omega}$ presenting a vorticity in a Cartesian coordinator system; $\phi$ presenting a magnitude of said vorticity; $\nabla \phi$ presenting a gradient of said $\phi$; $|\nabla \phi|$ presenting a magnitude of said $\nabla \phi$; $\epsilon_1$ presenting said factor in said $\vec{B}_1$.

3. The computer implemented numerical method in claimed 1, wherein said $\vec{B}_2$ has a formation as $$\vec{B}_2 = \varepsilon_2 \frac{\phi}{|\nabla \phi|} (\nabla^2 \vec{V}),$$

where, V presenting a velocity vector in the Cartesian coordinator system; $\nabla^2$ presenting a Laplace operator; $\epsilon_2$ presenting said factor in said $\vec{B}_2$.

4. The computer implemented numerical method in claimed 1, wherein said factor $\epsilon_1$ has a value with $0.05<\epsilon_1<0.07$.

5. The computer implemented numerical method in claimed 1, wherein said factor $\epsilon_2$ has a value with $0.03<\epsilon_2<0.05$.

* * * * *